March 29, 1960          J. D. RATJE          2,930,058

SCRAPED SURFACE CHILLER

Filed Dec. 27, 1955          3 Sheets-Sheet 1

INVENTOR.
J. D. RATJE
BY Hudson and Young
ATTORNEYS

March 29, 1960  J. D. RATJE  2,930,058
SCRAPED SURFACE CHILLER
Filed Dec. 27, 1955  3 Sheets-Sheet 2

INVENTOR.
J. D. RATJE
BY Hudson and Young
ATTORNEYS

March 29, 1960 J. D. RATJE 2,930,058
SCRAPED SURFACE CHILLER
Filed Dec. 27, 1955 3 Sheets-Sheet 3

INVENTOR.
J. D. RATJE
BY Hudson and Young
ATTORNEYS

United States Patent Office 2,930,058
Patented Mar. 29, 1960

1

2,930,058
SCRAPED SURFACE CHILLER

John D. Ratje, Phillips, Tex., assignor to Phillips Petroleum Company, a corporation of Delaware Application December 27, 1955, Serial No. 555,574

7 Claims. (Cl. 15—104.1)

This invention relates to an improved apparatus for continuously scraping the inner surface of a pipe upon which solids tend to accumulate. In a more specific aspect this invention relates to an improved apparatus for continuously scraping the inner surface of a tubular heat exchanger such as a scraped surface chiller. In another more specific aspect this invention relates to an improved scraped surface chiller.

Double-walled tubular heat exchangers are extensively used for the chilling of liquids and these devices are equipped with driven scrapers mounted in the straight pipe sections having blades which revolve against the inner surface of the pipe displacing therefrom solid materials which precipitate or crystallize from the liquid. These devices are known in the art as scraped surface chillers and are used in a variety of applications for chilling liquids, such as hydrocarbons, in order to precipitate or crystallize solid materials. In some cases, the chiller is used to cool the liquid and freeze from it solids which settle out readily at the cooled temperature. In other cases, a scraped surface chiller is an element in a system for separating liquids by means of fractional crystallization wherein one liquid crystallizes at a higher temperature than the remaining liquid and is separated therefrom. In the latter case, the liquids fed to the chiller are cooled to a temperature at which at least a portion of one component separates from the liquid in the form of crystals. Thereafter, the crystal slurry is fed to a crystal purification means.

The scraper blades employed in scraped surface chillers are generally narrow metal strips disposed longitudinally of the straight pipe sections and can be either rigidly or resiliently supported from a driven shaft arranged coaxially within the chiller pipe.

During development of the crystallization process there have been numerous structural failures of the scraper blades and the scraper hanger assemblies utilized to support the blade from the driven shaft. The majority of these failures occurred in the outlet portion of the chiller and appeared to be caused by dense crystal masses formed in the chilling operation and resulting in a greatly increased solids content of the slurry near the outlet portion of the chiller.

One object of this invention is to provide an improved scraped surface chiller.

Another object of this invention is the provision of an improved scraper blade hanger assembly wherein the scraper blade is maintained in contact with the chiller surface by balanced forces.

The provision of an apparatus for utilizing the forces acting upon a chiller scraper blade to maintain the blade in contact with the chiller surface at substantially constant pressure when operating with slurries of varying solids content is another object of the invention.

Still another object is the provision of a scraped surface chiller which can handle excessive amounts of solid material without damage to the scraper blade or to the chiller surface.

2

It is a further object of this invention to provide a scraper blade hanger assembly which will prevent pieces of metal or other foreign material from wedging between the hanger and chiller surface and damaging the hanger or the chiller surface.

Other and further objects and advantages will be apparent to one skilled in the art upon study of the specification and the accompanying drawing wherein.

In accordance with this invention, an improved scraped surface chiller is provided wherein the scraper blade is secured to the rotating shaft by a hanger assembly so that the forces acting upon the scraper blade maintain the blade in contact with the chiller surface at a substantially constant pressure regardless of the solids content of the slurry in the chiller. The scraper blades are mounted on a hanger which pivots on a supporting member located ahead of the scraper blade, i.e., in the direction of scraper rotation. Spring loading of the scraper is impressed at the opposite end of the hanger to ensure a slight pressure of the blade on the pipe wall so that the blade is maintained in contact with the chiller surface at all times, even when the chiller is not in operation. The principal utility of the spring is to overcome the force of gravity; the resistance offered by the chiller contents tends to force the scraper blade against the chiller wall when the scraper is in operation, if the blade is mounted in accordance with this invention.

Figure 1:
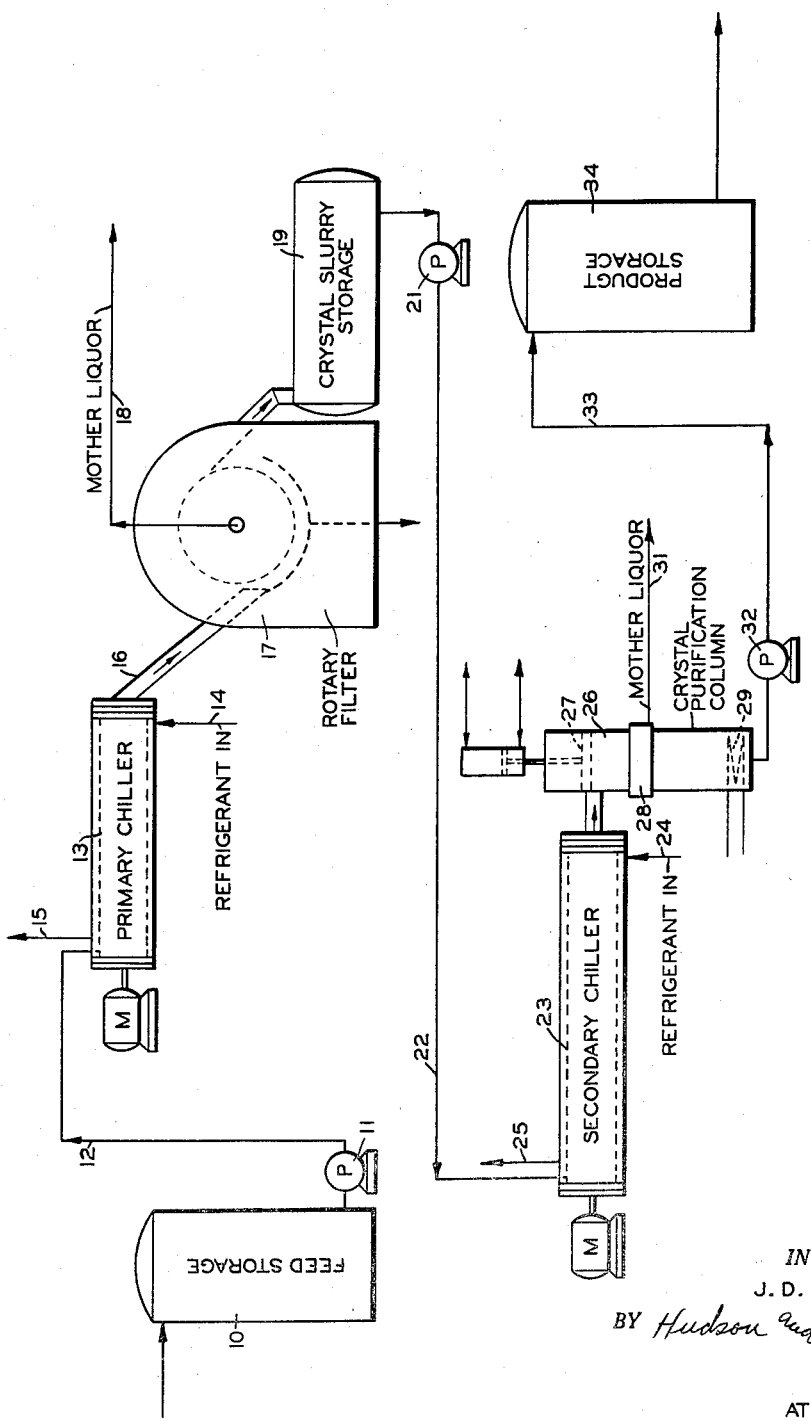
Figure 1 is a schematic flow sheet of a crystal purification system in which scraped surface chillers of the invention are advantageously utilized.

Referring now to the drawing and particularly to Figure 1, a crystallization process is illustrated wherein a feed material such as a mixture of isomeric xylenes is fed from storage, indicated by tank 10, by means of pump 11 through line 12 to primary chiller 13 which can advantageously be an improved double-walled scraped surface chiller fabricated in accordance with this invention. A refrigerant is introduced to the outer shell through line 14 and is removed through line 15. The slurry of crystals and mother liquor produced in chiller 13 is removed via line 16 to rotary filter 17 where mother liquor is removed through line 18 and the crystals are passed to crystal storage 19.

The crystals in storage vessel 19 are usually allowed to melt and this crystal melt is pumped by means of pump 21 through line 22 to a second chiller 23 wherein refrigerant is introduced to the outer shell by means of line 24 and is removed through line 25. The crystal slurry produced in chiller 23 is passed to a crystal purification column 26 wherein piston 27 moves the crystal mass through filtration zone 28 to heating zone 29. Mother liquor is removed from the purification column 26 through line 31 for reprocessing or storage. Purified crystal melt is removed from the purification column by means of pump 32 through line 33 to product storage 34.

Figure 2:
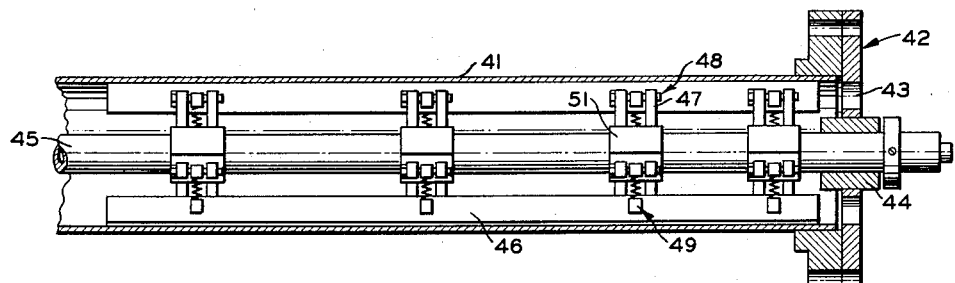
Figure 2 is a sectional elevation of a portion of the inner pipe of a scraped surface chiller of the invention.

Referring now to Figure 2 a portion of the inner pipe of a scraped surface chiller such as chiller 13 or chiller 23 of Figure 1 is illustrated by pipe 41, closed at one end by flanged head assembly 42 containing inlets 43 and bearing 44. Rotatable shaft 45 is positioned coaxially in pipe 41 by bearing 44. Scraper blades 46 are mounted on main lugs 47 by means of hanger assembly 48 and maintained against pipe 41 by the slight pressure exerted by spring assembly 49.

Figure 3:
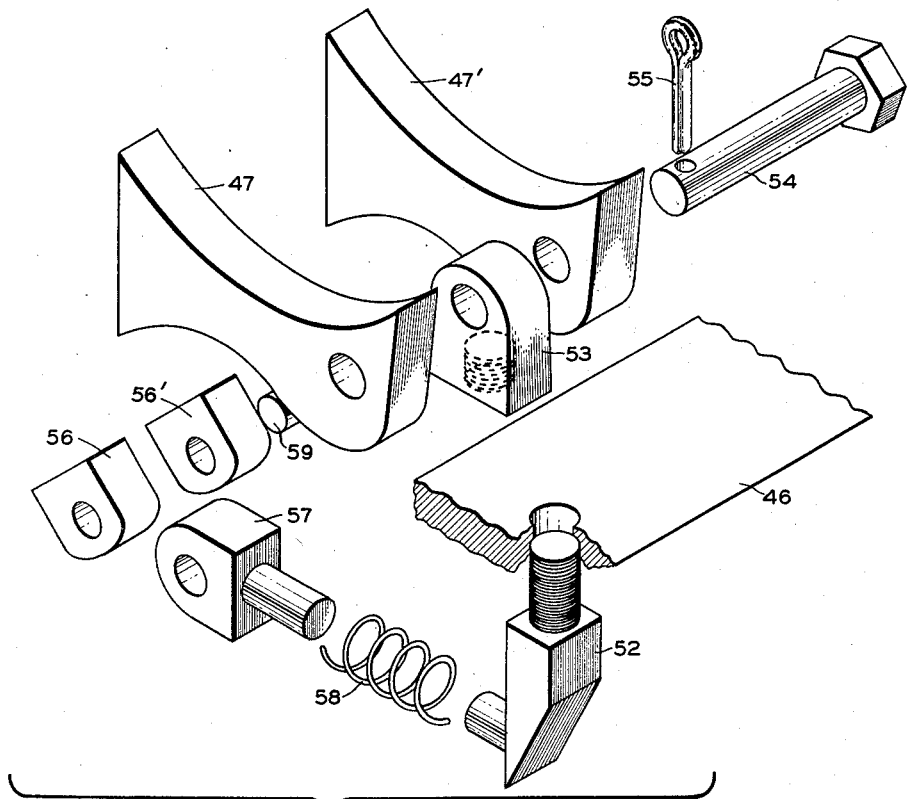
Figure 3 is an exploded perspective view of the elements of the scraper hanger assembly.

The elements of the scraper blade hanger assembly and spring assembly are shown in Figure 3. Main lugs 47 and 47′ are secured to shaft 45 by a means such as hexagonal hub element 51 shown in Figure 2.

Hanger assembly 48 comprises blade retainer 52 and blade hanger 53. Pin 54 secures blade hanger 53 to lugs 47 and 47′. The cotter key 55 secures pin 54 in place.

The spring assembly 49 comprises spring retainer lugs 56 and 56′, spring retainer 57 and spring 58. Spring retainer 57 is maintained in pivotal relationship with shaft 45 by means of pin 59.

Figure 4:
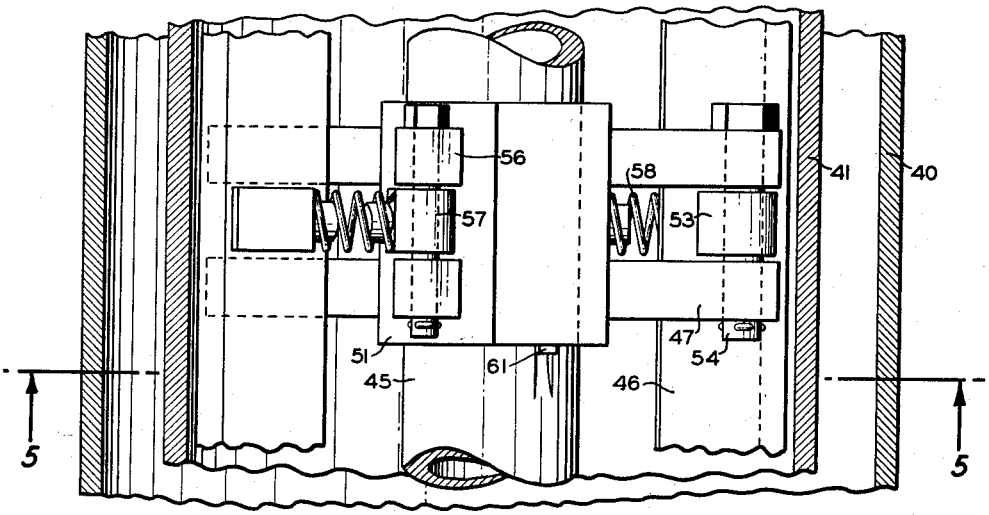
Figure 4 is a sectional elevation of the improved chiller.

Figure 4 shows a detail of the hanger and spring assembly illustrated in Figure 2.

Figure 5:
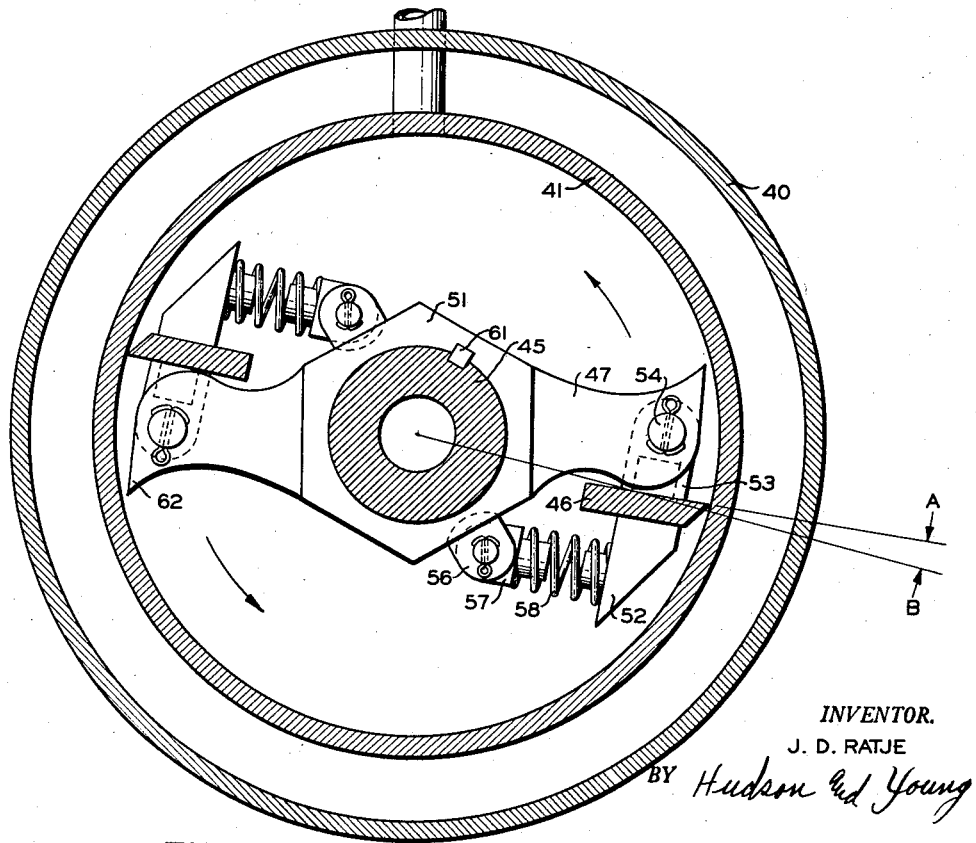
Figure 5 is a sectional view along line 5—5 of Figure 4.

Figure 5 provides an illustration of the operation of the device of this invention. The hub 51 is secured to shaft 45 by means of key 61 so that the entire assembly rotates with shaft 45 in the direction indicated by the arrows. Main lug 47 extends from hub 51 so that blade retainer 52 is pivotally connected to main lug 47 by pin 54 so that the pivotal connection is ahead of blade 46, in the direction of rotation.

Under normal chiller operations when a liquid, for example a hydrocarbon such as paraxylene, is chilled to produce crystals, some of the crystals stick to the chiller wall causing the scraper blade to be acted upon by a force which can be designated as $F_1$ which tends to force the scraper blade away from the chiller wall. However, when the slurry within the chiller becomes rich in solids a second force which can be designated as $F_2$ will act near the center of the scraper blade tending to force the blade into contact with the chiller wall. This second force results from an accumulation of crystals ahead of the blade and is a result of a combination of crystal-mass shear, and crystal-mass-to-blade friction. The invention provides a method for causing these forces to work against each other so as to be opposing forces rather than a cumulative force. It will be noted that the blade retainer 52 is secured to blade 46 at a point between the center of the face of the blade and the point of contact between the blade and the chiller surface, however, the blade retainer can be secured at any point on the face of the blade so long as it is secured rigidly so that the pivot point is pin 54. It will also be noted that the pivot pin 54 is positioned in main lug 47 with respect to the chiller wall so that blade 46 follows pin 54 at a slight angle from a line defining the radius of the pipes circle so that the point of contact of the blade and the chiller surface slightly leads the remaining portion of the blade face. The angle can be in the range of 0 to 30°, is preferably in the range 1 to 10° and is more preferably in the range 4 to 6°. The force $F_2$ creates a moment about the pivot point 54 tending to force blade 46 into contact with the surface of the pipe. This force opposes $F_1$, which tends to force the blade away from the chiller surface.

The moment created by $F_2$ should always be greater than the moment created by $F_1$. The moment created by $F_2$ can be increased by increasing the angle by which the blade face deviates from a line defining the radius of the circle. The moment created by $F_2$ can also be increased by moving pivot 54 closer to the chiller wall. The pivot 54 will always describe a circle about shaft 45 which is greater than the circle described by the center of the face of blade 46, i.e., the pivot 54 will always be closer to the chiller wall than the center of the face of the scraper blade 46.

A feature of the invention is the provision of nib 62, as shown in Figure 5, which is the pointed leading edge of main lug 47. This nib will dislodge and remove large pieces of metal resulting from structural failure occurring in the chiller or upstream from the chiller. The angle of the main lug face which trails the nib is such that pieces not removed by nib 62 are cleared by the trailing edge of main lug 47.

The spring retainer elements coact to provide a mechanical stop which prevents damage to spring 58.

The scraper assembly of my invention has been evaluated by operation in a scraped surface chiller and has been proven superior to conventional scraper assemblies. After several months of continuous operation, there has been no evidence of damage to the scraper assembly or of excessive scraper blade wear or chiller wall wear. On numerous occasions the scraper-drive load, as measured by a recording ammeter, was well beyond the range which has been found to cause severe damage to a conventional scraper assembly in a similar chiller operation.

Reasonable variations and modifications are possible within the scope of the disclosure of the present invention, the essence of which is the provision of an improved pipe scraper wherein the forces acting upon the blade are opposed to each other and under normal operation conditions are substantially balanced.

That which is claimed is:

1. A pipe scraper assembly adapted to be positioned in a pipe, comprising a rotatable shaft axially disposed within said pipe; a scraper blade radially spaced from said shaft, having a leading face adapted to contact material in said pipe and having a cutting edge contacting said pipe surface; a rigid lug means secured to said shaft; and a blade retainer means rigidly secured to said blade and pivotally connecting said blade to said lug at a point outside a circle described by the center of the face of the blade so that said blade follows said lug with the edge which contacts the pipe surface leading the remaining portion of the leading face of the blade.

2. A pipe scraper assembly adapted to be positioned in a pipe, comprising a rotatable shaft axially disposed within said pipe; a scraper blade radially spaced from said shaft, having a leading face adapted to contact material in said pipe and having a cutting edge contacting said pipe surface; a lug radially secured to said shaft and terminating in a pointed edge in the direction of rotation adjacent but out of contact with the pipe surface; and a blade retainer means rigidly secured to said blade and pivotably connecting said blade to said lug at a point outside a circle described by the center of the face of the blade so that said blade follows said lug with the edge contacting said pipe surface leading the remaining portion of the leading face of the blade by an angle in the range of 0 to 30° with respect to a radial line passing through the center of the leading face of the blade.

3. The assembly of claim 2 wherein the angle is in the range 4 to 6°.

4. The assembly of claim 2 wherein the angle is in the range 1 to 10°.

5. A pipe scraper assembly adapted to be positioned in a pipe, comprising a rotatable shaft axially disposed within said pipe; a scraper blade radially spaced from said shaft, having a leading face adapted to contact material in said pipe and having a cutting edge contacting said pipe surface; a first lug radially secured to said shaft; a blade retainer means rigidly secured to said blade and pivotably connecting said blade to said lug at a point nearer the pipe surface than the center of the face of the blade so that said blade follows said lug with the edge contacting said pipe surface leading the remaining portion of the leading face of the blade by an angle of 1 to 10° with respect to a radial line passing through the center of the leading face of the blade; a second lug pivotably secured to said shaft and adapted to receive one end of a compression spring; means attached to said blade retainer adapted to receive one end of a compression spring and aligned with said second lug; and a compression spring positioned upon said spring receiving means.

6. For use in a pipe scraper for scraping material from the inner surface of a pipe comprising a rotatable shaft axially positioned within the pipe and a scraper blade actuated by said shaft and having one edge in contact with the inner surface of the pipe, apparatus comprising a driving means rigidly secured to said shaft; and a blade retainer means rigidly connected to said blade at substantially right angles to the leading face of said blade and pivotably connected to said driving means at a point outside a circle described by the center of said blade.

7. For use in a pipe scraper for scraping material from the inner surface of a pipe comprising a rotatable shaft axially positioned within the pipe and a scraper blade actuated by said shaft and having one edge in contact with the inner surface of the pipe, apparatus comprising a driving means rigidly secured to said shaft; and a blade retainer means rigidly connected to said blade at a point nearer the edge of the blade in contact with the pipe surface than to the opposite edge and pivotedly connected to said driving means at a point outside a circle described by the center of said blade.

References Cited in the file of this patent

UNITED STATES PATENTS 2,449,012    Schley  ------------------ Sept. 7, 1948

FOREIGN PATENTS 599,625    France  ------------------ Jan. 16, 1926